(12) United States Patent
Berlin et al.

(10) Patent No.: US 8,660,863 B2
(45) Date of Patent: Feb. 25, 2014

(54) METHODS OF OFFERING AND PROVIDING A VARIABLE LIFE INSURANCE PRODUCT

(75) Inventors: Paul F. Berlin, Chicago, IL (US); Theresa Cordo, Closter, NJ (US); Michael C. DiPiazza, Freehold, NJ (US); Pamela Duffy, Purchase, NY (US); Richard M. Weber, Carlsbad, CA (US)

(73) Assignee: Paul F. Berlin, Chicago, IL (US)

( * ) Notice: Subject to any disclaimer, the term of this patent is extended or adjusted under 35 U.S.C. 154(b) by 0 days.

(21) Appl. No.: 12/616,588

(22) Filed: Nov. 11, 2009

(65) Prior Publication Data

US 2010/0169128 A1 Jul. 1, 2010

Related U.S. Application Data

(63) Continuation of application No. 10/677,839, filed on Oct. 2, 2003, now abandoned.

(51) Int. Cl.
*G06Q 40/00* (2012.01)

(52) U.S. Cl.
USPC .................................................. 705/4

(58) Field of Classification Search
USPC ........................................ 705/2, 3, 4; 283/57
See application file for complete search history.

(56) References Cited

U.S. PATENT DOCUMENTS

| | | |
|---|---|---|
| 5,752,236 A | 5/1998 | Sexton et al. |
| 5,775,734 A * | 7/1998 | George, Jr. ............... 283/57 |
| 5,933,815 A | 8/1999 | Golden |
| 5,991,744 A | 11/1999 | DiCresce |
| 6,049,772 A | 4/2000 | Payne et al. |
| 6,235,176 B1 | 5/2001 | Schoen et al. |
| 6,275,807 B1 | 8/2001 | Schirripa |
| 2002/0040307 A1 | 4/2002 | Roscoe et al. |
| 2002/0087365 A1 * | 7/2002 | Kavanaugh ............... 705/4 |
| 2002/0091610 A1 | 7/2002 | Smith |
| 2002/0165740 A1 | 11/2002 | Saunders |
| 2002/0173995 A1 | 11/2002 | Schiminovich |
| 2002/0174042 A1 | 11/2002 | Arena et al. |
| 2002/0174045 A1 | 11/2002 | Arena et al. |
| 2002/0184129 A1 | 12/2002 | Arena et al. |
| 2002/0198802 A1 | 12/2002 | Koresko |
| 2003/0105652 A1 * | 6/2003 | Arena et al. ............... 705/4 |
| 2003/0110061 A1 * | 6/2003 | Lakenbach et al. ........ 705/4 |

OTHER PUBLICATIONS

American Skandia Life Assurance Corporation, Life Insurance Policy Prospectus AS SPVLI-PROS, May 2002.

* cited by examiner

*Primary Examiner* — John Pauls
(74) *Attorney, Agent, or Firm* — Leydig, Voit & Mayer, Ltd.

(57) ABSTRACT

A variable universal life insurance product that includes a death benefit and associated investment vehicles is selectively offered. A life insurance policy chassis is provided by an insurance company to an asset manager. The asset manager combines the life insurance policy chassis with one or more associated investment vehicles managed by the asset manager to form a variable universal life insurance product. The asset manager selectively makes the insurance product available to respective clients of the asset manager. The insurance company providing service for the death benefit and the asset manager providing service for the associated investment vehicles.

51 Claims, 21 Drawing Sheets

Fig. 3A

Table of Contents

*Section* *Page*

1. BENEFITS AND SINGLE PREMIUM, CHARGE AND EXPENSES ............... 3
   Policy Description; Death Benefit; Riders; Premiums; Specifications And Charges.
2. VARIABLE ACCOUNT, THE FUNDS AND SUB-ACCOUNTS ................. 4
   Listing Of Sub-Accounts And Funds.
3. ABOUT THIS POLICY ............................................. 5
   An Overview Of Basic Policy Provisions.
4. WE WILL PAY ................................................... 5
   Payment Of Death Benefit; Option To Extend Coverage Beyond Maturity Age.
5. PREMIUMS ...................................................... 6
   Payment Of Premium Before Or At Delivery; Allocation Of Net Premium(s).
6. DEATH BENEFIT ................................................. 6
   How Death Benefit Is Determined.
7. FUND VALUE .................................................... 7
   How Fund Value Is Determined.
8. CASH VALUE .................................................... 7
   Cash Value Of The Policy.
9. TRANSFERS ..................................................... 7
   Transfers Under The Policy.
10. SURRENDER .................................................... 8
    Surrender For Cash Value.
11. PARTIAL SURRENDER ............................................ 8
    Partial Surrenders; Allocation Rules; Effect On Death Benefit.
12. LOANS ........................................................ 9
    Loan Value; Loan Interest; Allocation Rules.
13. LOAN ACCOUNT ................................................. 10
    Loan Account; Annual Loan Interest Rate; Interest Allocation.

FOR INFORMATION OR TO MAKE A COMPLAINT
CALL 1-800-487-MONY (1-800-487-6669)
OR WRITE TO US AT OUR OPERATIONS CENTER:
ONE MONY PLAZA, PO BOX 4830, SYRACUSE, NY 13221

Fig. 3B

| Section | Page |
|---|---|
| 14. RIGHTS OF OWNER. | 10 |
| Owner Of The Policy; Owners Rights. | |
| 15. BENEFICIARY | 10 |
| Beneficiary Of the Policy; Changing The Beneficiary. | |
| 16. THE VARIABLE ACCOUNT | 11 |
| Variable Account; Sub-Accounts; Changes To A Variable Account. | |
| 17. SUB-ACCOUNT UNIT VALUE | 12 |
| Unit Value Determination. | |
| 18. BASIS OF CALCULATION | 12 |
| Method Of Calculations On File With State Supervisory Official. | |
| 19. DATES AND POLICY PERIODS | 12 |
| How Dates Are Determined; How Periods Are Measured. | |
| 20. GENERAL PROVISIONS. | 12 |
| The Contract; Statements In Application; Incontestability; Suicide Exclusion; Assignment; Policy Payment; Relationships Postponement Of Certain Payments Of Transfers; Reports; Projection Of Benefits And Values; Nonparticipation. | |
| 21. SETTLEMENT OPTIONS | 14 |
| Election Of A Settlement Option; Settlement Options Available; Minimum Monthly Income Table. | |

ENDORSEMENTS, IF ANY

RIDERS, IF ANY

APPLICATION

Fig. 3C

1. Schedule of Benefits and Premiums, Charges and Expenses

Benefits and Premiums

Modified Single Premium Variable Life Policy

| | |
   |---|---|
   | Initial Death Benefit | $3,406,161 |
   | Single Premium | $1,000,000 |
   | Additional Premium | $   6,000 |

Under the terms of the Policy, the single premium and any additional premium payment shown above may not continue the Policy in force to the Maturity Age. The period for which the Policy will continue will depend on changes in fund performance, and if there are any partial surrenders and policy loans.

Charges and Expenses

Daily Mortality and Expense Risk Charge:
   0.002740%
   (1.0% annually)

Premium Tax Charge
   [2.0%] of premium received

Federal Tax Charge
   1.25% of premium received

Administrative charge
   $500.00 in the first policy year.

Fig. 3D

Section 1 Continued

Table of Death Benefit Percentages

Cash Value Accumulation Test

| Attained Age of Insured | Applicable Death Benefit Percentage | Attained Age of Insured | Applicable Death Benefit Percentage |
|---|---|---|---|
| 40 | 352.24% | 70 | 147.91% |
| 41 | 340.73% | 71 | 144.79% |
| 42 | 329.61% | 72 | 141.83% |
| 43 | 318.93% | 73 | 139.04% |
| 44 | 308.67% | 74 | 136.43% |
| 45 | 298.80% | 75 | 133.99% |
| 46 | 289.29% | 76 | 131.70% |
| 47 | 280.12% | 77 | 129.55% |
| 48 | 271.32% | 78 | 127.53% |
| 49 | 262.81% | 79 | 125.61% |
| 50 | 254.62% | 80 | 123.79% |
| 51 | 246.78% | 81 | 122.06% |
| 52 | 239.25% | 82 | 120.44% |
| 53 | 232.00% | 83 | 118.92% |
| 54 | 225.09% | 84 | 117.52% |
| 55 | 218.45% | 85 | 116.22% |
| 56 | 212.11% | 86 | 115.02% |
| 57 | 206.03% | 87 | 113.91% |
| 58 | 200.20% | 88 | 112.86% |
| 59 | 194.63% | 89 | 111.85% |
| 60 | 189.30% | 90 | 110.88% |
| 61 | 184.21% | 91 | 109.90% |
| 62 | 179.33% | 92 | 108.90% |
| 63 | 174.69% | 93 | 107.85% |
| 64 | 170.27% | 94 | 106.72% |
| 65 | 166.07% | 95 | 105.51% |
| 66 | 162.07% | 96 | 104.26% |
| 67 | 158.27% | 97 | 103.06% |
| 68 | 154.65% | 98 | 102.31% |
| 69 | 151.20% | 99 | 101.68% |
|  |  | 100 | 100.00% |

Fig. 3E

2. Variable Account, The Funds and Sub-Accounts

*See Variable Account section for further information*

The Variable Account is MONY America [Variable Account B] and includes the Sub-accounts listed below.

The Sub-accounts available for investment purposes, and the corresponding portfolios of the applicable funds are:

| Sub-Account | Applicable Fund |
|---|---|

Fig. 3F

3. About this Policy

*The following is an overview of some basic policy provisions to aid your understanding. The specific provisions of the Policy are found in the pages following this overview. In the event of a discrepancy between this overview and any specific provisions of this Policy, the specific Policy provisions will control.*

This is a Modified Single Premium Variable Life to Maturity Age (Age 100) Insurance policy. This Policy goes into effect on the Policy Date. This Policy is a "promise to pay" the Death Benefit in the event the Insured dies before the Maturity Age, while the Policy is in force. Payment will be made, subject to all the provisions of this Policy, when we receive due proof of death. The Insured is the person on whose life the Policy is based. The Death Benefit is paid to the Beneficiary. If the Insured is living at the Maturity Age, while the Policy is in force, we will pay the Cash Value, if any, to the Owner. Maturity Age means the policy anniversary following the Insured's 100th birthday. However, you may extend coverage under this policy beyond the Maturity Age (See details in Section 4)

The value of this Policy is based on the net premium(s) that you allocate to a Variable Account. The Fund Value is the combined value of a Variable Account and the Loan Account. The Cash Value, if any, is the Fund Value AFTER any Debt is deducted. Each Variable Account is an account that is separate from our General Account. The value of each Variable Account can increase or decrease depending on investment experience. Each Variable Account is made up of several Sub-accounts (sub-divisions) with different investment objectives. Each Sub-account invests only in the shares of its own portfolio of the applicable fund, securities, or other financial instruments. The measure of value in a Sub-account is called a Unit.

The value of Units in a Sub-account can only change on a Business Day. A Business Day is any day the New York Stock Exchange is open for trading or on any other day there is enough trading to change the Unit value of a Sub-account. Trading refers to the securities or other financial instruments held by the portfolio. Certain Sub-accounts may have liquidity constraints and may not be valued on a daily basis. See Section 2 for such limitations.

When we refer to "I" or "my" in a question, or to "you" or "your" in an answer, we mean the Owner. The Owner is the person who holds the Policy and who has the rights of ownership. The Owner chooses any options the Policy offers. When we refer to "we", "us" and "our" we mean MONY Life Insurance Company of America. "Administrative Office" means our office at 1740 Broadway, New York, NY 10019 and also includes our Operations Center at One MONY Plaza, P.O. Box 4830, Syracuse, NY 13221.

You can read more about the terms used in the summary on the following pages.

| | |
|---|---|
| "Beneficiary" | (see Section 15) |
| "Cash Value" | (see Section 8) |
| "Death Benefit" | (see Section 6) |
| "Fund Value" | (see Section 7) |
| "Owner" | (see Section 14) |
| "Units" and "Sub-account unit value" | (see Section 17) |
| "Variable Account" and "Sub-accounts" | (see Section 16) |

4. We Will Pay

What will the Company pay and when will they pay it?

If the Insured dies before the Maturity Age and while this Policy is in force, we will pay the Death Benefit of this Policy to the Beneficiary. Payment will be made subject to all the provisions of this Policy, when we receive due proof of death at our Administrative Office.

If the benefit is not paid by the end of 30 days from the date we receive due proof of death of the Insured, we will pay interest on the benefit if required by the state in which the Policy is delivered at the rate specified by that state. If interest is payable, it will be paid from date of the death to the date of payment of the benefit.

Fig. 3G

Payment in any case will only be made in accordance with all the provisions of this Policy.

If the Insured is living at the Maturity Age, we will pay the Cash Value, if any, to the Owner(s).

Can I extend coverage under this Policy beyond the Maturity Age?

Yes. If the Insured is living at the Maturity Age, you may extend coverage beyond that date until the date of the Insured's death.

When can I elect the extension?

Your written request must be received by us at our Administrative Office at least 30 days, but not more than 90 days, before the Maturity Age. The option to extend the Maturity Age will end on the date that the Death Benefit becomes payable.

If I elect this extension, what will the Death Benefit be after the Maturity Age?

The Death Benefit payable after the Maturity Age will be the Cash Value multiplied by the applicable percentage as of the Maturity Age before the extension. The applicable death benefit percentage is shown in Section 1.

5. Premiums

When and where must I pay the single premium and will the premium earn interest?

You must pay the single premium before or at delivery of the Policy. The single premium will earn interest at an annual rate of 4.0%. Interest will be credited from the later of the Policy Date and the Business Day that falls on, or next follows, the date we receive it at our Administrative Office until the date we transfer it to the Sub-account(s) as you have chosen. If you do not accept the Policy at delivery, we will refund any premium paid without interest.

Can I elect to make additional premium payments?

Yes. You may make additional premium payments during the first policy year, only if you have chosen this election on the application.

Will additional premiums earn interest?

Yes. Any additional premiums we receive before or after delivery of the Policy, but before the end of the "Right to Return Policy" period, will also earn interest at the annual rate of 4.0%.

What is a net premium?

A net premium is the single premium or any additional premium paid by you, less the Premium Tax Charge and Federal Tax Charge shown in Section 1.

When is a net premium transferred into the Sub-account(s) I've chosen?

If you have not returned the Policy at the end of the "Right to Return Policy" period, we transfer the net premium(s) with interest to the Sub-account(s) according to the premium allocation percentages as you have chosen on the application.

Are there any allocation rules for premiums?

Yes. The single premium allocation or any additional premium allocation must be made in whole percentages. If a Sub-account is to receive any allocation, the allocation must be at least 1% of the net premium, and the total must equal 100% of the net premium. For any additional premiums, we use the most recent valid premium allocation choice we have from you. You may change your allocation choice by writing to us at our Administrative Office. A change will take effect within 7 days after we receive that notice.

6. Death Benefit

What is the Death Benefit of the Policy?

The Death Benefit, less any outstanding Debt, will be paid to the Beneficiary when we receive due proof of the death of the Insured while this Policy is in force. The Death Benefit is the Fund Value on the

Fig. 3H date of death multiplied by the applicable percentage (see Cash Value Accumulation Test, Section 1). However, if liquidity restrictions are shown in Section 2, the death benefit will be based on the Fund Value at the next liquidity date.

7. Fund Value

What is the Fund Value on the Policy Date?

The Fund Value on the Policy Date is the net premium(s) received by us on or before the Policy Date with interest, less the administrative charge.

When are Fund Value calculations made?

After the Policy Date, Fund Value calculations are made on Business Days. If a Fund Value calculation has to be made for a day that is not a Business Day, then we will use the next Business Day. However, certain Sub-accounts may have liquidity constraints and may not be valued on a daily basis. See Section 2 for such limitations.

How is the Fund Value determined on a Business Day?

The Fund Value on a Business Day is determined as follows:

(a) Determine the Fund Value in each Sub-account on that Day (see below for details).
(b) Total the Fund Value in each Sub-account on that Day.
(c) Add any amounts in the Loan Account on that Day.
(d) Add interest credited on that Day on the amounts in (c) since the last Monthly Anniversary Day.
(e) Add any net premium received on that Day
(f) Minus the Mortality and Expense Risk Charge accrued as of that Business Day. The Mortality and Expense Risk Charge is shown in Section 1.

(g) Deduct any partial surrender made on that Day.

Certain Sub-accounts may have liquidity constraints and may not be valued on a daily basis. See Section 2 for such limitations.

Regarding (a) above, how is the Fund Value for each Sub-account determined on that Business Day?

For each Sub-account we multiply the number of Units credited to that Sub-account by its Unit value on that Day. The multiplication is done BEFORE the purchase or redemption of any Units on that Day. However, certain Sub-accounts may have liquidity constraints and may not be valued on a daily basis. See Section 2 for such limitations.

8. Cash Value

What is the Cash Value of this Policy?

The Cash Value of this Policy at any time is the Fund Value, less any Debt.

9. Transfers

When can I make transfers?

Transfers may be made among Sub-accounts only after the "Right to Return Policy" period has ended. We will not charge a fee for transfers.

When will a transfer request take effect?

Transfers will take effect on the Business Day that falls on, or next follows, the date we receive the request at our Administrative Office. However, some Sub-accounts may have liquidity restrictions. See Section 2 for any requirements or limitations on Sub-accounts that have liquidity restrictions. Also see Section 20 for information concerning post-

Fig. 3I ponement of transfers due to restricted Sub-accounts.

Are there any other limitations that may prevent transfers from taking effect?

Yes. We reserve the right not to execute a transfer if:

(a) any Sub-account that would be affected by the transfer is unable to purchase or redeem shares of the applicable fund in which the Sub-account invests;

(b) the transfer is a result of more than one trade involving the same Sub-account within a 30-day period;

(c) it is necessary for the Policy to be treated as a life insurance policy under Section 7702 of the Internal Revenue Code; or (d) the transfer would adversely affect Unit values. (This may occur if the transfer would affect one percent or more of the applicable fund's total assets.)

Can I authorize third party transfers?

Where permitted by law, we may accept your authorization of third party transfers. We may restrict the Sub-accounts that will be available to you for transfers. This restriction may occur during any period such third party is authorized to act for you. We will give you prior notice of any restrictions. We will not enforce such restrictions if you provide us with satisfactory evidence that:

(a) a court of competent jurisdiction has appointed such third party to act for you; or (b) you have appointed such third party to act for you for all of your finances.

10. Surrender

When may I surrender the Policy?

If there are not any liquidity restrictions on Sub-accounts, you may surrender the Policy at any time during the Insured's lifetime for its Cash Value, if any. See Section 2 for any liquidity restrictions on Sub-accounts. Also see Section 20 for information concerning postponement of surrenders due to restricted Sub-accounts.

11. Partial Surrender

Can I withdraw money from the policy?

Yes. After the first policy year, money may be withdrawn by making a partial surrender.

What are the rules and limitations for a partial surrender?

A partial surrender of this Policy may be made for any amount of at least $5,000 which is less than the Policy's Cash Value on the date of the partial surrender. We will not charge a fee for a partial surrender.

When will Partial surrenders take effect?

Partial surrenders will take effect on the Business Day that falls on, or next follows, the date we receive your request at our Administrative Office. However, some Sub-accounts may have liquidity restrictions. See Section 2 for any requirements or limitations on Sub-accounts that have liquidity restrictions. Also see Section 20 for information concerning the postponement of partial surrenders due to restricted Sub-accounts.

How can I specify partial surrender allocations and are there minimums?

You can specify partial surrender allocations by amount or percentage. Allocations by percentage must be in whole percentages and the minimum percentage is 1% against any Sub-account. Percentages must total 100%.

We will not accept an allocation that does not comply with the above rules or if there is not enough Fund Value in a Sub-account to provide its share of the allocation.

What if I don't specify an allocation?

If you do not specify an allocation, we will not accept the request for partial surrender.

Fig. 3J

How will a partial surrender affect the amount of Death Benefit?

On the day on which a partial surrender is made, we will reduce the Death Benefit on that day by the amount of the partial surrender multiplied by the applicable death benefit percentage as shown in Section 1.

12. Loans

May I obtain a loan from the Policy?

Yes, after the first policy year, loans may be obtained while this Policy has a loan value. The loan value is up to 90% of the Cash Value (less any accrued loan interest due on the next policy anniversary) on the date of the loan. A proper assignment of this Policy to us as security will be needed on forms provided by us.

Is there any interest charged on loans and how is it payable?

Loan interest at an annual rate of 5.25% will be charged in arrears on new or outstanding loans. Loan interest will accrue from day to day between policy anniversaries. Interest will be payable in arrears on each policy anniversary.

What else should I know about loans?

The Policy will be the sole security for any policy loan. But it need not be given to us for endorsement unless we ask for it.

Any reference to Debt under this Policy means total loan principal under this Policy plus any accrued loan interest.

If ever the Debt exceeds the Fund Value, this Policy will end. But we must first give at least 61 days notice of INSUFFICIENT VALUE. Any Debt may be repaid in whole or part before the Insured's death.

Any written notice referred to in this "Loans" Section will be mailed to the last known address of the Owner or any assignee of record.

When will loans take effect?

Loans will take effect on the Business Day that falls on, or next follows, the date we receive the request for the loan at our Administrative Office. However, some Sub-accounts may have liquidity restrictions. See Section 2 for any requirements or limitations on Sub-accounts that have liquidity restrictions. Also see Section 20 for information concerning postponement of policy loans due to restricted Sub-accounts.

How can I specify loan allocations and are there minimums?

You can specify loan allocations by amount or percentage. Allocations by percentage must be in whole percentages and the minimum percentage is 1% against any Sub-account. Percentages must total 100%.

We will not accept an allocation that does not comply with the above rules or if there is not enough Cash Value in a Sub-account to provide its share of the allocation.

What if I don't specify an allocation?

If you do not specify an allocation, we will not accept the request for the loan.

What happens if I don't pay the loan interest when it's due?

Any interest not paid when due will be added to the loan and bear interest at the 5.25% annual rate. It will be deducted from the Fund Value of each Sub-account in the same proportion that each bears to the total Fund Value on the policy anniversary.

How will Debt repayments be allocated?

Any Debt repayment must be earmarked as such and will be allocated to the Sub-account (s) according to the most recent premium allocation choice that we have from you. You must specify repayment allocations in whole percentages and the minimum percentage is 1%. Percentages must total

Fig. 3K

100%. We will not accept any repayment allocation that does not comply with these rules. Any Debt repayment in excess of the outstanding Debt will be refunded to you.

13. Loan Account

What is the Loan Account and how is interest credited to it?

The Loan Account is a portion of the Policy's Fund Value that was transferred from the Sub-accounts to secure any outstanding loan. The Loan Account will earn interest at an annual rate of 4.0%. The Fund Value of the Loan Account in excess of the Debt will be allocated to the Sub-accounts in a manner determined by us.

What if I pay the entire Debt between policy anniversaries?

If the entire Debt is repaid on a date that is not a policy anniversary, we determine the interest earned on the Loan Account from the last date it was calculated to the date that payment was received by us at our Administrative Office. This interest will be allocated on the date of repayment among the Sub-accounts in accordance with the most recent premium allocation choice that we have from you (see Loans section 12).

14. Rights Of Owner

Who is the Owner of the Policy and what rights does the Owner have?

While the Insured is living, all rights, benefits, options and privileges under this Policy or allowed by us belong to the Owner unless otherwise provided by endorsement. These rights include the right to change the Beneficiary, to assign the Policy, to transfer policy values or make full or partial surrenders, all in accordance with our rules and procedures. The Owner is the person so named in the attached application for this Policy unless otherwise provided by endorsement.

15. Beneficiary

Who is the Beneficiary?

The Beneficiary is the person to whom the benefit of the Policy is payable upon the death of the Insured. The Beneficiary is the person so named in the attached application for this Policy unless otherwise provided by endorsement.

If the beneficiary designation requires the Beneficiary to be living or surviving, then, unless otherwise provided, that Beneficiary must be living on the 14th day after the Insured's death or, if earlier, the date we receive due proof of the Insured's death. The share of the Death Benefit of any Beneficiary who is not living on that earlier day will be payable to the remaining Beneficiaries. Payment will be made in the manner provided for in that designation.

What if there is no Beneficiary named or then living?

Unless otherwise provided in the beneficiary designation, the Death Benefit will be payable to the Insured's executors or administrators.

Can I change the Beneficiary?

Yes, you can change the Beneficiary, unless you have given up this right by designating an irrevocable beneficiary, as long as the Insured is living by writing to us at our Administrative Office. You do not need to return the Policy to make a change unless we ask for it.

When will a Change of Beneficiary take effect?

A change will take effect when we record it retroactively as of the date the request was signed. We shall not be charged with notice of a change of Beneficiary until the change is received at our Administrative Office. The change will be subject to any payment made or action taken by us before we received your request.

Fig. 3L

16. Variable Account

What is a Variable Account and what is its purpose?

The variable benefits under this Policy are provided through investments we make in one or more Variable Accounts. Each Variable Account is an investment separate account established and maintained by us separate from our general account or other separate accounts. We use each Variable Account for our single premium variable life policies and, if permitted by law, for other policies or contracts.

A Variable Account can be unmanaged or directly managed by one or more managers. For those Variable Accounts that are directly managed, we will enter into investment management agreements with one or more investment managers for each Variable Account. We will select investment managers at our discretion

What else should I know about a Variable Account?

We own the assets in each Variable Account. Assets equal to the reserves and other liabilities of each Variable Account will not be charged with liabilities that arise from any other business we conduct. We may from time to time transfer to our general account, assets which exceed the reserves and other liabilities of a Variable Account.

The Income, gains or losses realized and unrealized from the assets allocated to a Variable Account are credited to or charged against that Variable Account without regard to our other income, gains or losses.

What changes can the Company make to a Variable Account?

A Variable Account may be divided into one or more sub-accounts. Each Variable Account is established pursuant to and governed by the laws of the State of Arizona. We may, to the extent permitted by applicable laws and regulations, A. combine a Variable Account with any of our other separate accounts;

B. create new separate accounts;

C. transfer assets of a Variable Account to another separate account;

D. cause a Variable Account that is managed by one or more investment managers to change investment managers;

E. cause a Variable Account that is unmanaged to become managed directly by one or more investment managers;

F. cause a Variable Account to mature early;

G. change the investment policy of any directly managed Variable Account;

H. add new sub-accounts to or remove existing sub-accounts from a Variable Account;

I. make sub-accounts (including new sub-accounts) available to such classes of contracts as we may determine;

J. cause a Variable Account that invests in fund portfolios to substitute new portfolios for any existing portfolio, and K. operate a Variable Account under the direction of a committee or in any other form permitted by law.

To the extent required by law, we will obtain prior approval from the appropriate regulatory authority before we make any of the changes listed above. If we substitute shares of one fund portfolio for those of another fund portfolio, we will notify you before we do so.

What should I know about Sub-accounts?

We use the assets of each separate Sub-account to buy shares in a corresponding portfolio of the applicable fund, securities, or other financial instruments. (See Section 2).

Income and realized and unrealized gains or losses from assets of each Sub-account are credited to or charged against that Sub-account without regard to income, gains or losses in the other Sub-accounts, our general account or any other separate accounts. We reserve the right to credit or charge a Sub-account in a different manner if required, or appropriate, by reason of a change in the law.

Fig. 3M

When will the Company value the assets in the Sub-accounts?

We will value the assets of a Sub-account on each Business Day, if applicable, after the assets in its corresponding fund portfolio, securities and other financial instruments have been valued on that Day. We may value the assets of some Sub-accounts other than each Business Day due to liquidity restrictions. See Section 2 for any requirements or limitations on Sub-accounts that have liquidity restrictions.

17. Sub-Account Unit Value

What is the unit value of a Sub-account?

The Unit value of a Sub-account on its first Business Day is set at $10. To determine the Unit value of a Sub-account on any subsequent Business Day, we take the prior Business Day's Unit value and multiply it by the Net Investment Factor for the current Business Day. The Net Investment Factor for a Sub-account equals:

(a) the net asset value per share of each fund held in the Sub-account at the end of the current Business Day; divided by (b) the net asset value per share of each fund held in the Sub-account at the end of the prior Business Day.

For any Policy transaction which is applied to a Sub-account, the dollar amount of transaction is divided by the Sub-account Unit value to determine the number of Units credited or subtracted from a Sub-account.

18. Basis Of Calculation

What should I know about the basis of calculation?

The method of determining Cash Values has been filed with the insurance supervisory official of the state in which this Policy is delivered. The values under this Policy are not less than the minimum values required by the law of the state in which the Policy is delivered.

Minimum Cash Values are based on the 1980 Commissioners Standard Ordinary Age Last Birthday Smoker or Nonsmoker Mortality Tables, as applicable, and interest at an annual rate of 4% a year.

19. Dates And Policy Periods

How are periods measured in the Policy?

Months, years and anniversaries are measured from the Policy Date unless we state otherwise. Policy months start on the same date in each calendar month as the Policy Date. That means if the Policy Date is on the 1st of the month, then each policy month will start on the 1st of the month.

What if the Policy Date is a date that doesn't occur in all months, such as the 31st?

If the Policy Date is the 29th, 30th or 31st of a month, there will be some calendar months when there is no such date. For those months the policy month will start on the last day of the calendar month.

Where dates are shown, the numbers stand for month, day and year, in that order. The Policy Date is shown on Page 1.

20. General Provisions

What makes up this Contract?

This Policy is a contract and has been issued in consideration of the application and payment of the single premium (shown in Section 1). The application, a copy of which is attached, is a part of the Policy. The Policy, any attached riders and/or endorsements and the application make up the entire contract.

The questions in this Policy, including the questions in any rider or endorsement attached hereto, are for purposes of convenience and reference only. They do not form a part of and shall not in any way limit or affect the meaning or interpretation of any of the terms and conditions of this Policy.

Fig. 3N

How does the Company use the statements I make in the application?

All statements made in the application will be considered to be representations and not warranties. No statement may be used to make this Policy invalid or to deny a claim under it, unless the statement is contained in the written application, a copy of which must have been attached to the Policy at issue or delivery.

When will this Policy be incontestable?

This Policy will be incontestable, as to statements made in the application for it, after it has been in force during the lifetime of the Insured for 2 years from its Date of Issue.

What does the Company pay in case of the suicide of the Insured?

If the Insured commits suicide, within 2 years of the Date of Issue, the amount payable by us will be limited to the amount of premium(s) paid less: (a) any Debt; and (b) any partial surrenders.

How does the Company handle an assignment of the Policy?

We shall not be charged with notice of assignment of any interest in this Policy until the assignment (or a copy) is received and recorded by us at our Administrative Office. We are not responsible as to the validity or effect of any assignment. We may rely solely on the statement of the assignee as to the amount of his or her interest. All assignments will be subject to any Debt on this Policy. The interest of any Beneficiary (except an irrevocable beneficiary) or other person will be subordinate to any assignment, whenever made. The assignee will receive any sum payable to the extent of his or her interest.

What may the Company require for Policy payment?

In any settlement of this Policy, by reason of death, surrender, or otherwise, we may require the return of the Policy. Any Debt on this Policy will be deducted when we determine the proceeds.

Due proof of death and a claim form must be submitted to us at our Administrative Office.

What do Relationships in any designation refer to?

Relationships used in any beneficiary or other designation will refer to the Insured unless the wording indicates otherwise.

Who has the authority to change this Policy?

No change in the Policy will be valid until it is approved by one of our executive officers. This approval must be endorsed on or attached to this Policy. No agent or other person has authority to change the Policy, waive any of its provisions or accept representations or information not in the written application.

Can the Company postpone certain payments or transfers?

We will usually pay any amount payable on surrender, partial surrender or loan within 7 days after we receive written request for the payment at our Administrative Office. However, any amount payable from a restricted Sub-account may be postponed until 7 days after the next following liquidity date (see Section 2) after we receive written request for payment at our Administrative Office from that restricted Sub-Account. We will usually pay any Death Benefit within 7 days after we receive due proof of death of the Insured.

Transfers from a restricted Sub-account also may be postponed until that Sub-account liquidity date (see Section 2).

What reports will the Company send?

We will send a report at least annually to the Owner showing the then current status of the Policy. It will show since the last report: any additional premiums received, interest earned on Fund Value in the Loan Account, and any partial surrenders.

Fig. 3O

It will show as of the current report date: Death Benefit, Cash Value, and any Debt. It will also show as of the current and prior report dates: Fund Value, Sub-account Unit values, and any other information required by state law or regulation.

21. Settlement Options

What is a Settlement Option?

Instead of being paid in a single sum, you may elect to receive any death or surrender proceeds from this Policy in the form of a Settlement Option. If you elect a Settlement Option in the form of income payments, the dollar amount of the payments and how long will we pay them (for example, over the lifetime of a single Payee or joint Payees), will depend on the terms of that settlement.

Can any proceeds be paid in a single sum?

Yes, if one of the Settlement Options described below is not elected, any death or surrender proceeds will be paid in a single sum.

Whom can I select as the payee under a Settlement Option?

Any natural person (not a business entity or trust) in his or her own right. The Payee must be the person to whom proceeds are payable under this Policy.

When can I elect a Settlement Option?

At any time while the Insured is living, you may elect to have the proceeds paid under one of the Settlement Options described below.

How can I elect or change a Settlement Option for Death Proceeds?

You may choose an option or change a prior election while the Insured is living by sending written request to us at our Administrative Office. However, we must record this choice or change. You do not need to return the Policy to us to make the choice or change unless we ask for it.

What is the minimum amount of proceeds I can elect to have applied toward one of these Settlement Options?

The amount of proceeds applied toward any of these Settlement Options must be at least $1,000.

Can the Payee choose a Settlement Option?

Yes, if the Payee was to receive the proceeds in a single sum, the Payee may instead choose one of the Settlement Options for proceeds not yet paid. This must be done by written request to us at our Administrative Office not more than 1 month after the proceeds become payable.

What Settlement Options are available?

— Option 1. *Interest Income* – Under this option, we hold the proceeds and credit the interest earned on those proceeds to the Payee. We set the rate of interest for each year, but that rate will never be less than 2 3/4% a year. This Option will continue until the earlier of the date the Payee dies or the date you elect another Settlement Option.

— Option 2. *Income for Specified Period* – Under this option, the Payee receives an income for the number of years chosen. We then calculate an income that will be based on the Minimum Monthly Income Table 2 for that period. Note that the longer the period selected (i.e. number of years) the lower the dollar amount per $1,000 of proceeds. Payments may be increased by additional interest as we may determine for each year.

— Option 3. *Single Life Income* – Under this option, a number of years called the period certain is chosen. We will then pay income to a single Payee for as long as that Payee lives or for the number of years chosen (the period certain), whichever is longer. If the Payee dies after the end of the period certain, the income payments will stop.

The period certain elected may be:

(a) 0, 10, or 20 years; or (b) until the total income payments equal the proceeds applied (this is called a refund period certain).

Fig. 3P

The amount of the income payments will be figured by us on the date the proceeds become payable. This amount will be at least as much as the applicable amount shown in the Minimum Monthly Income Table 3. The income amounts are based on the 1983 Table a (discrete functions, without projections for future mortality) with 3 1/2% interest.

If the income payments for the period certain elected are the same as income payments based on another available longer period certain, we will deem an election to have been made for the longer period certain.

— Option 3A. *Joint Life Income* – We pay income during the joint lifetime of two people (the Payee and another person). That means if one person dies, we will continue to pay the same income (or a lesser income) to the survivor for as long as the survivor lives.

The survivor may receive the same dollar amount that we were paying before the first Payee died or two-thirds of that amount depending on the election made at the time of settlement. Note that if the lesser (two-thirds) amount paid to the survivor is elected, the dollar amount payable while both persons are living will be larger than it would have been if the same amount paid to the survivor had been elected.

The amount of income payable while both persons are living (the joint lifetime) will be figured by us on the date the proceeds become payable. This amount will be at least as much as the applicable amount shown in the Minimum Monthly Income Table 3A. The minimum income amounts are based on the 1983 Table a (discrete functions, without projections for future mortality) with 3 1/2% interest.

If a person for whom Option 3A is chosen dies before the first income amount is payable, the survivor will receive settlement instead under Option 3 with 10 years certain.

— Option 4. *Income of Specified Amount* – Under this Option, the dollar amount of the income payments is chosen. We will pay that amount for as long as the proceeds and interest last; but, the dollar amount chosen must add up to a yearly amount of at least 10% of the proceeds applied. Interest will be credited annually on the balance of the proceeds. We set the rate of interest for each year, but that rate will never be less than 2 3/4% a year.

Are any other Settlement Options available?

Yes, the proceeds may be settled under any other option we may agree to.

How often will the Payee receive income payments?

Payment will be made monthly unless quarterly, semi-annual or annual payment is requested by you (or the Payee) when the option is chosen. If payments of the chosen frequency would be less than $25 each, we may use a less frequent payment basis.

Multiply the monthly payment by the appropriate factor to obtain less frequent payment amounts

|  | Ann. | Semi-Ann. | Quarterly |
|---|---|---|---|
| OPTION 2 | 11.85 | 5.97 | 2.99 |
| OPTION 3  0 Years Certain | 11.68 | 5.90 | 2.97 |
| OPTION 3  20 Years Certain, or Refund Period Certain | 11.80 | 5.95 | 2.99 |
| OPTION 3  10 Years Certain or OPTION 3A | 11.74 | 5.92 | 2.97 |

Will I (or the Payee) receive an explanation of the Settlement Option?

Yes, you (or the Payee) will receive a supplementary contract when the proceeds are settled under one of these options. The contract will state the terms of the settlement.

Fig. 3Q

What will be paid when the Payee dies after the effective date of the supplementary contract?

The amount payable under each Option at the Payee's death will be paid as stated below in a single sum to the Payee's executors or administrators unless otherwise provided in the settlement approved by us at the time it was chosen.

Option 1 or 4 - Any unpaid proceeds and interest to the date of death.

Options 2 or 3 - The amount which, with compound annual interest, would have provided any future income payments for: (a) the specified period (Option 2); or (b) the specified period certain (Option 3). Interest will be at the rate or rates assumed in computing the amount of income.

What else should I know about Settlement Options?

Before we pay Option 3 or 3A, we shall need proof of age of the Payee(s) which satisfies us.

MINIMUM MONTHLY INCOME TABLES

These Tables show the minimum monthly income per $1,000 of proceeds applied under the applicable option.

Table 2 - Income for a Specified Period Option

| Years | Monthly Amount | Years | Monthly Amount |
|---|---|---|---|
| 1 | $84.37 | 11 | $8.75 |
| 2 | 42.76* | 12 | 8.13 |
| 3 | 28.89 | 13 | 7.60 |
| 4 | 21.96 | 14 | 7.15 |
| 5 | 17.80 | 15 | 6.76 |
| 6 | 15.03 | 16 | 6.41 |
| 7 | 13.06 | 17 | 6.11 |
| 8 | 11.58 | 18 | 5.85 |
| 9 | 10.42 | 19 | 5.61 |
| 10 | 9.50 | 20 | 5.39 |

Fig. 3R

Minimum Monthly Income Tables (continued)

Table 3 – Single Life Income Option.

The life income shown is based on the Payee's age last birthday on the due date of the first income payment.

| 10 Years Certain | | 20 Years Certain | | | 10 Years Certain | | | 20 Years Certain | | | 10 Years Certain | | | 20 Years Certain | | | 0 Years Certain | | | Refund Period Certain | | |
|---|---|---|---|---|---|---|---|---|---|---|---|---|---|---|---|---|---|---|---|---|---|---|
| Male | Female | AGE | Male | Female | Male | Female | AGE | Male | Female | Male | Female | AGE | Male | Female | Male | AGE | Female | Male | AGE | Female |
| $3.21 | $3.14 | 10* | $3.20 | $3.13 | $3.74 | $3.56 | 35 | $3.71 | $3.55 | $5.42 | $4.93 | 60 | $4.97 | $4.71 | $3.46 | 25 | $3.34 | | | |
| 3.22 | 3.15 | 11 | 3.21 | 3.14 | 3.78 | 3.59 | 36 | 3.75 | 3.58 | 5.54 | 5.04 | 61 | 5.04 | 4.77 | 3.59 | 30 | 3.44 | | | |
| 3.23 | 3.16 | 12 | 3.23 | 3.15 | 3.82 | 3.62 | 37 | 3.78 | 3.61 | 5.67 | 5.14 | 62 | 5.10 | 4.84 | 3.75 | 35 | 3.57 | | | |
| 3.24 | 3.17 | 13 | 3.24 | 3.17 | 3.86 | 3.65 | 38 | 3.82 | 3.64 | 5.80 | 5.25 | 63 | 5.16 | 4.91 | 3.96 | 40 | 3.73 | | | |
| 3.26 | 3.18 | 14 | 3.25 | 3.18 | 3.90 | 3.69 | 39 | 3.85 | 3.67 | 5.94 | 5.37 | 64 | 5.22 | 4.98 | 4.22 | 45 | 3.93 | | | |
| 3.27 | 3.19 | 15 | 3.27 | 3.19 | 3.94 | 3.72 | 40 | 3.89 | 3.70 | 6.08 | 5.50 | 65 | 5.28 | 5.05 | 4.56 | 50 | 4.20 | | | |
| 3.29 | 3.20 | 16 | 3.28 | 3.20 | 3.99 | 3.76 | 41 | 3.93 | 3.73 | 6.23 | 5.63 | 66 | 5.33 | 5.12 | 4.99 | 55 | 4.54 | | | |
| 3.30 | 3.22 | 17 | 3.30 | 3.21 | 4.04 | 3.80 | 42 | 3.98 | 3.77 | 6.38 | 5.77 | 67 | 5.38 | 5.19 | 5.57 | 60 | 5.00 | | | |
| 3.32 | 3.23 | 18 | 3.31 | 3.23 | 4.09 | 3.84 | 43 | 4.02 | 3.81 | 6.54 | 5.92 | 68 | 5.43 | 5.25 | 6.39 | 65 | 5.64 | | | |
| 3.34 | 3.24 | 19 | 3.33 | 3.24 | 4.14 | 3.88 | 44 | 4.06 | 3.84 | 6.71 | 6.07 | 69 | 5.48 | 5.32 | 7.53 | 70 | 6.53 | | | |
| 3.36 | 3.26 | 20 | 3.35 | 3.25 | 4.20 | 3.92 | 45 | 4.11 | 3.88 | 6.88 | 6.23 | 70 | 5.52 | 5.38 | | | | | | |
| 3.37 | 3.27 | 21 | 3.37 | 3.27 | 4.25 | 3.97 | 46 | 4.16 | 3.93 | 7.05 | 6.40 | 71 | 5.55 | 5.43 | | | | | | |
| 3.39 | 3.29 | 22 | 3.38 | 3.28 | 4.31 | 4.02 | 47 | 4.21 | 3.97 | 7.22 | 6.58 | 72 | 5.59 | 5.48 | | | | Male | AGE | Female |
| 3.41 | 3.30 | 23 | 3.40 | 3.30 | 4.38 | 4.07 | 48 | 4.26 | 4.01 | 7.40 | 6.76 | 73 | 5.62 | 5.53 | | | | | | |
| 3.43 | 3.32 | 24 | 3.42 | 3.32 | 4.44 | 4.12 | 49 | 4.31 | 4.06 | 7.57 | 6.95 | 74 | 5.64 | 5.57 | | | | | | |
| 3.46 | 3.34 | 25 | 3.45 | 3.33 | 4.51 | 4.18 | 50 | 4.37 | 4.11 | 7.75 | 7.15 | 75 | 5.66 | 5.60 | $3.44 | 25 | $3.33 | | | |
| 3.48 | 3.36 | 26 | 3.47 | 3.35 | 4.58 | 4.24 | 51 | 4.42 | 4.16 | 7.92 | 7.34 | 76 | 5.68 | 5.63 | 3.56 | 30 | 3.42 | | | |
| 3.50 | 3.38 | 27 | 3.49 | 3.37 | 4.66 | 4.30 | 52 | 4.48 | 4.21 | 8.09 | 7.54 | 77 | 5.70 | 5.66 | 3.70 | 35 | 3.54 | | | |
| 3.53 | 3.40 | 28 | 3.52 | 3.39 | 4.74 | 4.36 | 53 | 4.54 | 4.27 | 8.26 | 7.74 | 78 | 5.71 | 5.68 | 3.88 | 40 | 3.69 | | | |
| 3.56 | 3.42 | 29 | 3.54 | 3.41 | 4.82 | 4.43 | 54 | 4.60 | 4.32 | 8.42 | 7.94 | 79 | 5.72 | 5.70 | 4.11 | 45 | 3.87 | | | |
| 3.58 | 3.44 | 30 | 3.57 | 3.43 | 4.91 | 4.51 | 55 | 4.66 | 4.38 | 8.57 | 8.14 | 80+ | 5.73 | 5.71 | 4.38 | 50 | 4.11 | | | |
| 3.61 | 3.46 | 31 | 3.59 | 3.45 | 5.00 | 4.58 | 56 | 4.72 | 4.44 | | | | | | 4.73 | 55 | 4.40 | | | |
| 3.64 | 3.49 | 32 | 3.62 | 3.48 | 5.10 | 4.66 | 57 | 4.78 | 4.51 | | | | | | 5.18 | 60 | 4.78 | | | |
| 3.67 | 3.51 | 33 | 3.65 | 3.50 | 5.20 | 4.75 | 58 | 4.85 | 4.57 | | | | | | 5.76 | 65 | 5.28 | | | |
| 3.71 | 3.54 | 34 | 3.68 | 3.52 | 5.31 | 4.84 | 59 | 4.91 | 4.64 | | | | | | 6.52 | 70 | 5.94 | | | |

* and under
+ and over

The minimum income for any age not shown in the 0 Years Certain and Refund Period Certain columns is calculated on the same mortality and interest assumptions as the minimum income for the ages shown and will be quoted on request.

Table 3A – Joint Life Income Option

The income shown is based on the ages (at last birthday on the due date of the first income payment) of the 2 persons during whose joint lifetime payments are to be made.

| Same Income Continued to Survivor | | | | | | Two-Thirds of Income Continued to Survivor | | | | | |
|---|---|---|---|---|---|---|---|---|---|---|---|
| AGE OF FEMALE | AGE OF MALE | | | | | AGE OF FEMALE | AGE OF MALE | | | | |
| | 50 | 55 | 60 | 65 | 70 | | 50 | 55 | 60 | 65 | 70 |
| 50 | $3.83 | $3.96 | $4.04 | $4.09 | $4.13 | 50 | $4.20 | $4.35 | $4.51 | $4.69 | $4.89 |
| 55 | 4.03 | 4.16 | 4.27 | 4.36 | 4.42 | 55 | 4.36 | 4.54 | 4.73 | 4.95 | 5.18 |
| 60 | 4.16 | 4.34 | 4.51 | 4.66 | 4.78 | 60 | 4.55 | 4.76 | 4.99 | 5.25 | 5.53 |
| 65 | 4.27 | 4.51 | 4.76 | 4.99 | 5.20 | 65 | 4.76 | 5.01 | 5.29 | 5.62 | 5.97 |
| 70 | 4.37 | 4.66 | 4.99 | 5.34 | 5.67 | 70 | 4.99 | 5.28 | 5.63 | 6.04 | 6.49 |

The minimum income for any other combination of ages or for 2 persons of the same gender are calculated on the same mortality and interest assumptions as the minimum income for the combination of ages shown and will be quoted on request.

Fig. 3S

METHODS OF OFFERING AND PROVIDING A VARIABLE LIFE INSURANCE PRODUCT

COPYRIGHT NOTICE

A portion of this patent document contains material that is subject to copyright protection. The copyright owner has no objection to the facsimile reproduction by anyone of the patent document, as it appears in the Patent and Trademark Office patent files or records, but otherwise reserves all copyright rights whatsoever.

BACKGROUND

The invention relates generally to products involving insurance, e.g., life insurance, and investments, and to methods of offering and/or providing such products with the participation of an insurance company and an asset manager. More particularly, the invention relates to variable universal life insurance products having a death benefit and investments, and to methods of offering and providing such products with the participation of an insurance company and an asset manager.

BRIEF SUMMARY

The invention provides products involving insurance, e.g., life insurance, and investments, and methods of offering and/ or providing such products with the participation of an insurance company and an asset manager. "Offering" is used herein in a broad sense and may encompass activities such as making available, introducing, marketing, advertising and sponsoring. Similarly, "providing" is used herein in a broad sense and may encompasses activities such structuring, managing, servicing and administering.

Preferred embodiments of the invention provide variable universal life insurance products having a death benefit and investments, and methods of offering and providing such products with the participation of an insurance company and an asset manager. In a preferred embodiment, the asset manager is not part of the insurance company; and the products are offered and/or provided to existing or new clients or customers of the asset manager. In this embodiment, the insurance company and the asset manager may be thought of as co-sponsoring the product.

In a preferred embodiment of the invention, the products are offered and/or provided with a cost of insurance fee that is fixed for the life of the product and/or is a single fee. A fixed fee may be a percentage, fixed for the life of the product, of a variable criterion or criteria used to set the insurance cost or costs. For example, the cost of insurance fee may be the only recurring charge paid to the insurance company.

In the preferred embodiments, insurance aspects of the products, e.g., a death benefit, and asset management aspects of the product are separated and are provided, administered, etc., by different companies. The insurance company, e.g., manages the insurance aspect, and the asset manager, e.g., manages the investment aspect. From the prospective of purchasers of such products, this arrangement permits clients of an asset manager to obtain an insurance-related product that provides for management of associated assets by the same asset manager managing other assets of the client. From the prospective of asset managers, this arrangement encourages asset managers to offer such products to their clients because the asset managers will continue to manage the assets of the client associated with an insurance-related product.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 3A-3S are parts of an exemplary variable life insurance policy which may be the basis of the life insurance product which offered according to a preferred embodiment of the invention.

DETAILED DESCRIPTION OF THE PREFERRED EMBODIMENTS

The preferred embodiments of the invention provide an insurance product that permits an individual to invest and manage his or her money more effectively. They need not choose between an insurance policy that offers tax deferral but not management by professional asset managers, or investments that are not taxed deferred. An individual utilizing the insurance product according to the preferred embodiment can thus choose how they want the assets allocated among different investment vehicles and still have the investments tax deferred and professionally managed by a single asset manager (such as, for example, a bank, "wrap" manager, trust department, money manager, or "wire house"). The insurance company and asset manager are each positioned to do what they do best, but can combine their strengths to be a "manufacturing partner" of a unique insurance product which still has the advantage of tax deferral. The asset manager manages more money without becoming an insurance company and the insurance gains an important competitive advantage in offering life insurance without having to become an asset manager. More money under management of a professional asset manager leads to more fee income for the asset manager.

The preferred embodiments include "performance-driven" pricing of the insurance product. The charges assessed are guaranteed for life as a function of the assets in the product, not the death benefit. In this way, the death benefit automatically adjusts to the fund value and the policy is never underfunded. Conventionally, illustrations are provided when policies are sold to show an expected return on the policy after payment of charges. Such illustrations can be confusing and misleading because the charges can change significantly from that assumed in the illustration. The preferred embodiments eliminate the potential for confusion because of such illustrations.

Preferably, the products offered and/or provided by preferred embodiments of the invention provide for a single fixed fee to be charged for the insurance costs associated with the product for the life of the product. In a preferred embodiment, the fixed fee is expressed as a fixed percentage of assets under management that may vary over the life of the product.

Figure 1:
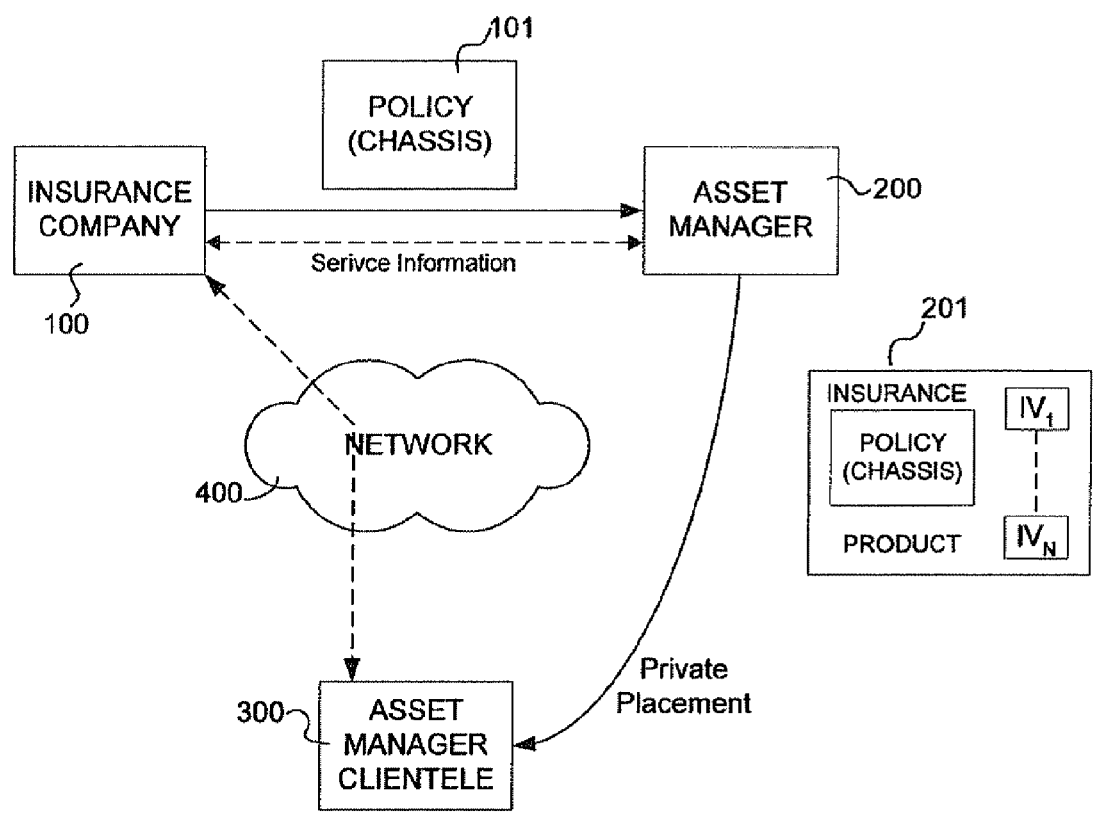
FIG. 1 is an illustration of a method of offering a life insurance product according to a preferred embodiment of the invention.

A preferred embodiment of the present invention is the method of offering a variable life insurance product shown in FIG. 1. It includes various transactions between insurance company 100, asset manager 200, and clientele 300 of asset manager 200. Insurance company 100 prepares a life insurance policy 101 and files the policy with the appropriate state regulation agencies as necessary to obtain approval of the policy. The life insurance policy has characteristics, described below, which make it well suited for the offering method according to the preferred embodiment. The policy is preferably a private placement variable universal life insurance policy or other universal life insurance policy, but it may be any type of life insurance policy that employs any of the characteristics described below.

Conventionally, life insurance companies and other insurers have offered variable universal life insurance policies as a stand-alone product directly to their own customers through insurance agents and brokers. The individual pays to the insurer a single premium, periodic premium or combination thereof to fund the insurance policy. The assets of the policy are invested into at least one investment vehicle selected by the individual from among a group of investment vehicles chosen for the policy by the insurer. The investment vehicles for the policy are typically sponsored by a variety of different respective money managers. However, those money managers compete with each other for the insured's investment assets in a very direct manner. This competition among money mangers may reduce the incentive of the money managers to offer high quality investment vehicles for the policy.

In providing insurance products to individuals, insurers reach out to the individuals and compete with other companies offering financial products to individuals. In particular, life insurance is viewed as competing with the financial services and products of asset managers because the payment of life insurance premiums reduces the amount of money remaining available to the policyholder for investment. For these reasons and others, life insurance companies traditionally have different distribution channels (insurance agents, etc.) than asset managers. Given the amount of information associated with each financial product or life insurance policy, for example, the investment options, premium payments, fees to the asset manager, individuals may require coaxing to purchase a particular financial product or life insurance policy, which increases the effort sellers must expend on each individual. In addition, it is inefficient for the insurance product provider or life insurance policy provider to identify appropriate individuals with whom they have had no prior relationship for a particular financial product or life insurance policy. This makes the process more costly, makes it difficult to obtain access to select clientele and adhesion of clientele.

In the preferred embodiment of FIG. 1, insurance company 100 maintains a computer system (not shown) for servicing its various life insurance policies, including life insurance policy 101. This computer system, for example, determines and applies various fees and charges associated with insurance policies, and calculates the account value of each individual policy. The computer system preferably provides policyholders with secure, web-enabled access to policy information. Insurance company 100 adapts its computer system to be capable of servicing life insurance policy 101. Specifically, the computer system is programmed or otherwise adapted to be efficient in administering and servicing a life insurance policy utilizing a plug and play chassis and/or having the characteristics described below.

The efficient administration and servicing of life insurance requires an appropriately programmed computer system. Appropriate software is commercially available, such as the VANTAGE-ONE® series of software available from Computer Sciences Corporation. However, the VANTAGE-ONE® software is not well suited for administering and servicing a life insurance policy utilizing a plug and play chassis and/or having the characteristics below. The plug and play chassis permits assets managers to customize the policy and offer a respective customized insurance product to their clientele utilizing their own investment vehicles. The VANTAGE-ONE® software requires that all information be entered and set up for each insurance policy. This information includes information, such as the basic payment mechanism (i.e., single premium, annual premiums, variable or fixed premiums, etc.), product options and rules (loans, etc), plan of insurance, and investment vehicles. In the preferred embodiments of the invention utilizing a plug and play chassis, the great majority of this information remains the same for the respective insurance product sponsored by different asset managers and only the investment vehicles vary from insurance product to insurance product. Nevertheless, the conventional software requires insurance company 100 to reenter and setup policy information for each respective insurance product even though that policy information remains the same.

In one aspect of the invention, the administrative computer system of insurance company 100 does not execute conventional software requiring that the policy information is reentered and set up each time a new insurance product is created. Instead, the administrative computer system of insurance company 100 executes software that is well suited for the plug and play chassis where the policy information remains the same but different respective insurance products built on the plug and play chassis have different investment vehicles offered by the respective sponsoring asset manager. The software may be a modification of the VANTAGE-ONE® software or other software similar in functionality to the VANTAGE-ONE® software. This software preferably provides appropriate interfaces permitting personnel of insurance company 100 to reuse basic policy information for the respective insurance products of different asset managers while entering the investment vehicles unique to that asset manager. The software may also implement any other unique aspects of the insurance policy or product embodiments described in this application. For example, the software may implement a unique test to ensure that any policy premium is administered in a manner that ensures that the policy complies with death benefit guidelines necessary to obtain tax preferred treatment of the insurance policy. In order for the features and advantages of the preferred embodiments of the invention to be fully realized, it is preferable that the software executed by the administrative computer system of insurance company 100 is modified or that other software is installed or executed to implement those features and advantages in the administrative computer system accordingly.

Insurance company 100 provides the life insurance policy 101 to asset manager 200. It should be understood that the policy provided to asset manager 200 is not the insurance product ultimately offered to clientele 300, but rather serves as a "plug and play" chassis underlying the insurance product. The plug and play chassis allows insurance company 100 to offer a product that the asset manager may sponsor and make proprietary. The investment assets remain under investor control in coordination with insurance company 100, and it is the investor who selects their participation in the various investment vehicles of the asset manager.

Asset manager 200 is permitted and licensed to supplement the policy with a dedicated pool of investment vehicles in order to assemble the end insurance product. In this regard, it should be understood that the "transferred" life insurance policy is not a specific written document that must be signed by each or any one of the clientele purchasing the end insurance product, but may be electronic information sent to asset manager 200 to be used in assembling the end insurance product pursuant to the accompanying permissions and licenses. The life insurance policy may be transferred through any suitable communications network, including the Internet.

Asset manager 200 develops an insurance product 201 based on the universal life insurance chassis 101. For that purpose, asset manager selects a plurality of different investment vehicles IV(1) to IV(n) to include in the insurance product and serve as sub-accounts for the transferred life insurance policy. The investment vehicles may be chosen at the discretion of, or according to the criteria of, asset manager 200. Asset manager 200 preferably maintains a computer system (not shown) for servicing its various investment vehicles and client accounts, including investment vehicles IV(1) to IV(n). This computer system, for example, determines and applies various fees and charges associated with the investment vehicles, and regularly calculates and reports the account value of each client. The investment vehicles may be offered by asset manager 200 independently of the end insurance product, and thus asset manager 200 preferably needs to make minimal adaptations to its computer system for it to provide information for servicing the investment vehicles when bundled with the universal life insurance policy 101 in an end insurance product 201 to insurance company 100. It should be understood from the following discussion that asset manager 200 is only responsible for managing the investment of the funds and reporting the accounts for the investment vehicles for the insurance product 201 and is not responsible for servicing the insurance policy underlying insurance product 201.

Insurance product 201 is preferably offered and marketed as a private placement to clientele 300 of asset manager 200 rather than to the general market. In particular, the offering is not made through the typical distribution channels of insurance company 100 (i.e., insurance brokers, agents, etc.) or through any of the other traditional distribution channels of life insurance companies. The selection and/or targeting of potential clients (e.g., high net worth individuals) is at the discretion of asset manager 200 and is made through the distribution channels of asset manager 200. Preferably, it is offered to sophisticated buyers and other clientele 300 in order to aid in the funding of their financial planning needs. Of course, agents may be selected by asset manager 200 or insurance company 100 to target and offer the insurance product to potential clients on their behalf.

Clientele 300 purchasing the insurance products thereafter contact the insurance company 100 with respect to servicing of the life insurance policy, including the death benefit payment. Preferably, insurance company 100 provides electronic access, such as web-enabled access or toll free automated interactive voice response (IVR) systems, to their policyholders. Although both parties may utilize the same communications network 400 and access methods, as shown by the separate dashed lines in FIG. 4, clientele 300 has independent access and contacts with the parties.

The relationship of the insurance company and the asset manager is developed as follows. Preferably, asset manager 200 owns or utilizes a registered representative under contract to insurance company 100. The manner of the offering, in terms of solicitation and advertising, will adhere to Rule 502(c) as listed under the General Rules and Regulations Promulgated under the Securities Act of 1933. The asset manager determines which funds it wishes to select as dedicated sub-accounts to be offered within the insurance product. The funds may be proprietary funds or $3^{rd}$ party funds. The insurance company and the asset manager draft a "participation agreement" which appoints the asset manager's fund management as sub-account managers and sets forth mutual covenants, duties, responsibilities and rights. This also includes definition of any liquidity restrictions that may be required by the asset manager. The insurance company files the "Policy Offering Memorandum" which creates an exclusive version of the S-P VLI product for the asset manager's customers. The insurance company and the asset manager installation teams collaborate on mechanisms for transfers of fund, assessment of fees, reporting of NAVs/AUM by the asset manager to the insurance company. There may be a Letter of Intent/reciprocal non-disclosure agreement, and an engagement fee. The asset manager decides how to distribute the product. It may be distributed by the insurance company network of broker-dealers, but preferably it is distributed by the asset manager's selected advisors (possibly with training by the insurance company) or the asset manager's exclusive distributor of S-P VLI negotiates any necessary distribution agreements with the insurance company regarding issues such as licensing, training, soliciting, selling, processing and servicing. In any case, the distribution is subject to using registered representatives in accordance with any applicable regulatory requirements. The insurance company, asset manager, and the exclusive distributor determine means for policyholder access to sub-account information and policy values, use of web-sites, IVR systems, toll free telephone line response team, etc., and distribution assessment, taking into account insurance liability, etc.

In a private placement product incorporating a variable life insurance policy, the product is offered to a select group of individuals pursuant to the Securities Act of 1933 which grants a private placement exemption and standards for separate accounts. The Investment Company Act of 1940 grants an exemption of the registration of investment vehicles for investors meeting certain criteria: 1) 3c(1) funds (products) with less than 100 "accredited" investors defined as: Individuals with more than $1 million net worth or $200,000 of net income in each of last 2 years and expectation of same continuing income; entities with more than $5 million gross assets; and certain regulated entities (b-ds, insurance companies); and 2) 3c(7) exception for funds/products of unlimited "Qualified Purchasers" defined as: a natural person with $5 million in investments; an entity with $25 million in investments; and certain other regulated high-net-worth institutions (insurance companies, employee benefit plans, banks). Normal State Insurance Department regulations apply.

Figure 2:
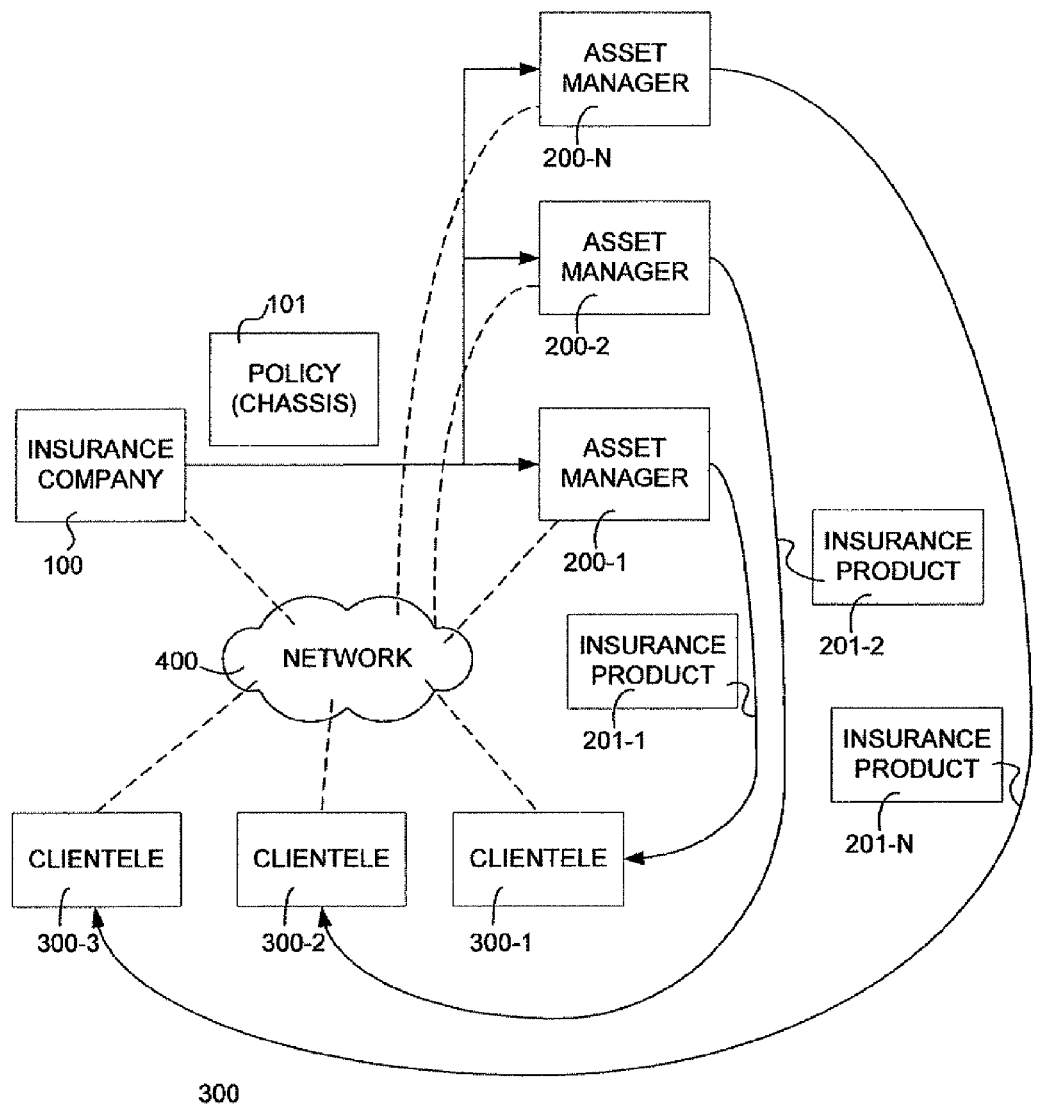
FIG. 2 is an illustration of an embodiment in which an insurance company offers a life insurance policy chassis to multiple asset managers.

FIG. 2 illustrates an alternative embodiment in which a life insurance company provides the same common life insurance policy chassis 101 to multiple asset managers 200-1 to 200-N. Each one of multiple asset managers 200-1 to 200-N provides its respective sponsored insurance product 201-1 to 201-N to its own clientele 300-1 to 300-N, perhaps but not necessarily through unique distribution channels. Each life insurance product 201-1 to 201-N is based on the common life insurance policy chassis 101 but is otherwise unique and proprietary. Each such insurance product 201-1 to 201-N may be distinguished by the investment vehicles made available for use with the product, or by any other criteria or terms chosen by the respective asset manager. Similar to the previous embodiment, the clients separately contact the insurance company.

The life insurance product 201 developed utilizing the process described in this application and based on the universal life insurance chassis 101 will preferably have the following characteristics. First, the insurance product 201 is made available and sold only to a restricted group of investors and the issuance of a policy is subject to underwriting approval. Preferably, Insurance Company 100 relies upon the Regulation D exemption and Section 4(2) of the Securities Act of 1933. The group consists of qualified investors who satisfy certain suitability requirements and are required to represent that they are a qualified purchaser or accredited investor, as defined by Regulation D under the 1933 Act pursuant to the exceptions under the Investment Company Act of 1940 sections 3c(1) and 3c(7). Second, the investment vehicles associated with the insurance product are made available as "Plug and Play" investment sub-accounts by the sponsoring asset manager. The investments are independently managed by the asset manager. The asset manager will not utilize policy illustrations at the point of selling the insurance product. The illustrations are not necessary because, as described elsewhere in this application, the insurance charges are fixed percentage of the account value and thus do not threaten to mislead the insured when the policy is issued. The Net Amount at Risk is determined periodically on the basis of 1) account value and 2) attained age of the insured and the required corridor of insurance under IRC Section 7702. Product information, including current value of the investments, net amount at risk, and risk-class appropriate "Monte Carlo simulation" data will be provided via secure, Web-enabled access for clients and their advisors.

Preferably, the life insurance policy 101 which serves as the chassis for insurance product 201 has the following characteristics (in addition to the characteristics set forth above for the insurance product 201). First, the charges are guaranteed based on account value. Based on factors such as gender, age, and medical underwriting, issued policies will bear a single charge, guaranteed to be based on a percentage of account value, and calculated and assessed daily. There are no fund charges or other assessments except a one-time underwriting fee and a pass-through of state premium and federal DAC taxes. Consequently, as the policy matures, the insurance charges will not become disproportionately large compared with the account value of the investments.

In fixed universal life insurance policies, the insurance company manages the portfolio of investment vehicles. In variable universal life insurance policies, the policyholder "manages" those, if any, portfolios of investment vehicles underlying the policy that belong to the policyholder after payment of various insurance charges. There can be multiple layers of insurance charges, such as M&E, cost of insurance (COI), commissions (concessions made in policy design), fund fees paid to the insurance carrier, loads, premium tax, and surrender charges, the cumulative amount of which can be substantial. Furthermore, the insurer typically reserves the right to increase COIs and other charges. Just as auto/homeowners insurance rates will change with experience and the carrier's need for ROE, so too will life insurance charges change in the future. As the policy matures, the cost of insurance for the death benefit increases to the extent that it substantially decreases or even eliminates the fund value entirely. Constant return illustrations typically made by insurance agents, etc., as part of the conventional offering method for the policy create the potential for confusion and consequent liability for all parties. Market volatility and its impact is not easily demonstrated in these illustrations and few customers comprehend the difference between the illustrations and the policy guarantees. The drop in market value as the policy matures increases the risk substantially. There is thus a substantial risk of and/or potential for under-funding and early lapse of the variable universal life insurance policies.

There are no commission concessions accommodated in the policy chassis. However, this does not preclude asset managers, advisors or other distributors from charging their clients a fee for placement of the insurance product 201 and/or asset management. The product is preferably funded with a single premium, and hence is a Modified Endowment Contract (MEC). However, a term rider can be provided for those insureds wishing to pay periodic premiums and maintain a death benefit-to-cash value ratio sufficient to qualify as Non-MEC. Policy illustrations will not accompany the policy at the point-of-sale unless required by state regulators. Policy information, such as death benefit information, insurance charges, etc., will be provided via secure, Web-enabled access for policy owners and their advisors.

Figure 3A:
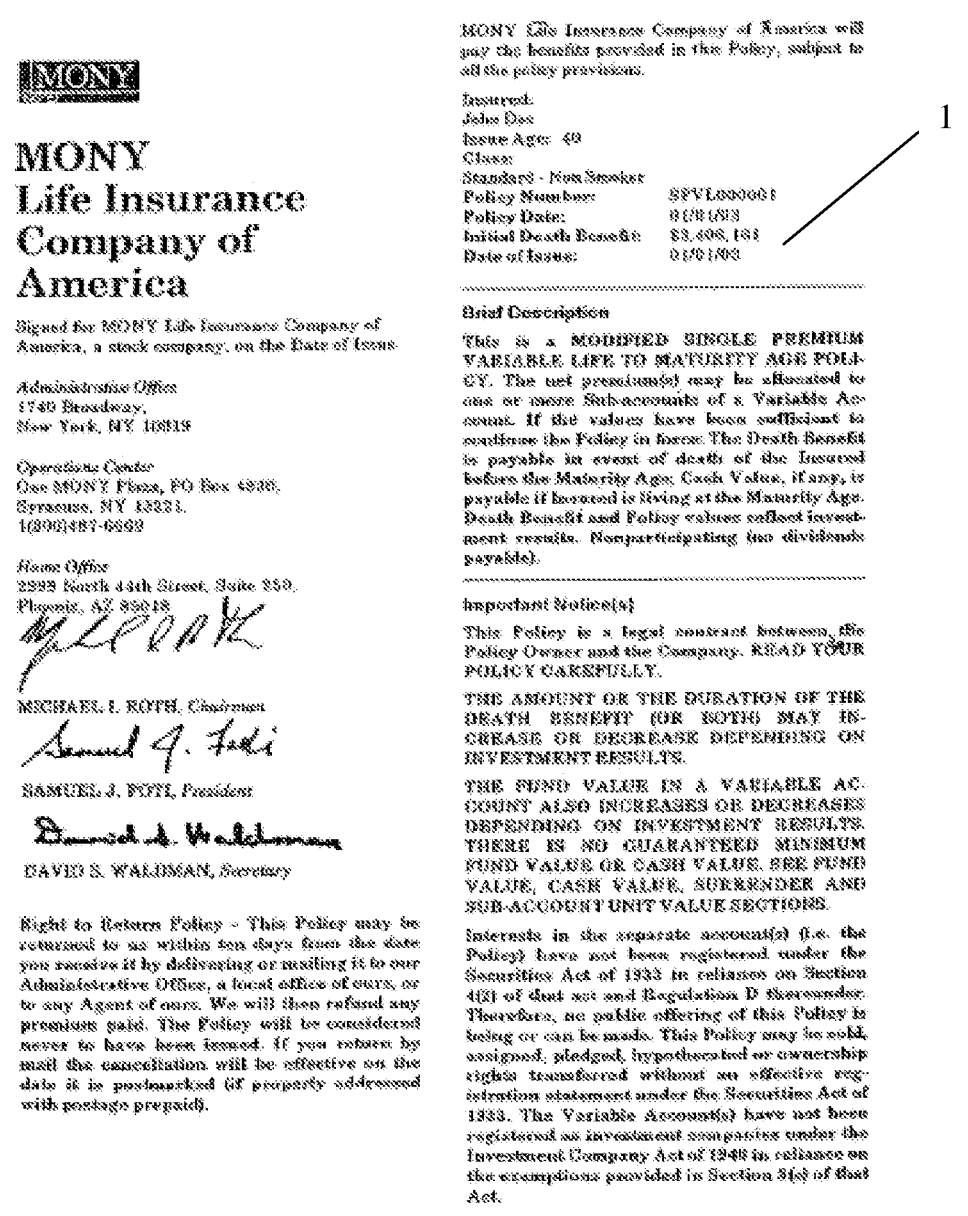

The preferred policy form is a Private Placement Variable Universal Life (PPVUL) policy having the characteristics described above as well as the characteristics described below with reference to the policy form 1 shown in FIGS. 3A-3S (reference character 1 is shown only in FIG. 3A but applies to all pages of FIGS. 3A-3S). However, different policy forms may be developed and utilized in the invention. Specifically, policy forms may be developed and utilized which extend beyond the PPVUL and UL forms, and are nevertheless part of the invention if any of the major characteristics described above are employed.

The preferred policy is a sponsor proprietary Private Placement Modified Single Premium Variable Life to Age 100 Plan. The issue ages for the policy are ages 40 to 85. The policy will not be illustrated at the time of sale. There is an initial single premium. After deductions for taxes and a policy fee, the remaining amount of the premium may be allocated to one or more sub-accounts of a Separate Account managed by the Asset Manager. The policy allows for the election of additional premium payments during the first policy year. Additional premiums are accepted within one year from the policy date, provided the Insurance Company is notified of the amount(s) at the time of policy application.

In general, variable universal life insurance policies have an advantage over many financial products since the accumulated earnings on the investments are tax-deferred until distributed. They also have a potential advantage over other tax-deferred investment vehicles available to individuals, such as real estate and stocks, which inherently lack professional management and diversification. However, the tax treatment of variable universal life insurance products can be complicated. Internal Revenue Code §7702 sets forth a cash value accumulation "CVA" test for a minimum death benefit payment requirement as a percentage of the account value in order to qualify a life insurance product for tax-preferred treatment. This section also limits the ability of the policyholder to pay certain high levels of premiums or when any material change is made to the policy.

If a policyholder's cumulative premium payments during the first seven years exceed the limit specified in the Internal Revenue Code, known as the "7-Pay Limit", the life insurance policy becomes what is known as a "Modified Endowment Contract" (MEC). The 7-Pay Limit depends in part on the amount of the policy's death benefit and the age of the insured. At any point in time during the first seven policy years, premiums paid cannot exceed the sum of the annual 7-pay limits or the policy will become a MEC. This means that the total limit will increase each of the first seven policy years. After seven years, MEC testing will not apply unless at any point in time "a material change" requires your policy to start a new 7-pay testing period with new 7-pay limits. Whenever there is a "material change" under a policy, the policy will generally be (a) treated as a new contract for purposes of determining whether the policy is a Modified Endowment Contract and (b) subjected to a new 7-pay period and new 7-pay limit. Material changes include: a face amount increase, the addition of a rider or an increase in its amount, a reduction in rating, a change to non-smoker status or substitution of insured and all could result in a loss of "grandfathered" status. There are also changes considered reductions in benefits during a 7-pay test period that trigger a retroactive recalculation and testing of premiums. A reduction in benefits during a 7-pay test period causes the policy to be retested as if the policy had been issued at the reduced level of benefits. This could cause the policy to become a Modified Endowment Contract based upon premiums paid prior to the reduction in benefits.

If a life insurance policy becomes an MEC, any death benefit provided under the contract will still qualify for income tax free treatment. However, there may be additional taxes and penalties on any loans, distributions or withdrawals from the policy during the life of the insured. Any distribution from a policy that is a MEC will be taxed on an "income-first" basis. Distributions for this purpose include a loan (including any increase in the loan amount to pay interest on an existing loan or an assignment or a pledge to secure a loan) or withdrawal. Any such distributions will be considered taxable income to the extent there is gain in the account value of the policy at the time of distribution. A 10% penalty tax will apply to the taxable portion of most distributions and withdrawals made by the policyholder prior to age 59½.

The policy in the preferred embodiments of the invention does not carry a minimum guaranteed death benefit. The death benefit will vary according to investment performance. The death benefit is the fund value on the date of death multiplied by the applicable death benefit percentage. The death benefit percentages are determined according to the Cash Value Accumulation (CVA) Test. The death benefit percentages vary by attained age, gender, and tobacco use status of the insured. The factors for obtaining the fixed charge for standard class applicants include for example age, underwriting class, or gender. Factors considered in sub-standard case applicants additionally include medical condition, impairments, or smoking status. The CVA Test death benefit percentages are equal to the reciprocal of the net single premium that funds $1 of future coverage and endows for one dollar when the insured attains age 100 assuming a 4.0% interest rate and the 1980 CSO Age Last Birthday Mortality Tables as applicable. An example table of CVA Test death benefit percentages is shown in FIG. 3E. Preferably, the death benefit is at least the minimum to comply with Section 7702.

The policy does not have a guaranteed fund value. The fund value will vary according to investment performance. A fund table is maintained for each policy. The fund value is the value of all units held in the Variable Account plus the value of the Loan Account. Borrowed funds will be credited with a guaranteed minimum rate of 4.0% annually. There are no cost of insurance charges. The premium load is 1.25% plus an amount equal to the applicable state premium tax rate. At issue, a $500 policy fee will be assessed. Mortality & Expense risk charges will vary by sex, smoking status, and issue age will be deducted from the fund value. The policy provides a guaranteed a maximum annual M&E charge.

Cash value is the fund value less any debt. There are no surrender charges. The policy has a variable account divided into one or more sub-accounts. The asset manager selects funds and the customer chooses its selection. The sub-accounts correspond respectively to the variable investment vehicles made available by the asset manager through the insurance product. See the brackets placed around the Variable Account Section in FIG. 3F. The sub-accounts are entirely and exclusively managed by the asset manager and, if desired, its corporate siblings. The asset manager must establish, by legal regulations, portfolios dedicated solely to the funding of sub-accounts of insurance product 201 and which do not contain funds from investors "outside" the dedicated insurance product sub-accounts. This avoids "investor control" issues addressed in a recent IRS Private Letter Ruling. Also, should an asset manager's investor choose to transfer amounts from any of the publicly available funds managed by the asset manager to sub-accounts within the life insurance product, such mutual funds(s) must be sold for cash and any gain or loss is immediately recognizable for tax purposes.

The policy has a loan provision. A loan may be taken any time a policy has a positive Cash Value. The maximum amount that can be borrowed at any time is 90% of the Cash Value, less any Outstanding Debt including a provision for loan interest due through to the next anniversary. Loan interest is payable in arrears on each policy anniversary at an annual rate which varies by duration. The loan interest rate is 525% in all years.

When a loan is taken an amount equal to the loan is transferred out of the Fund Value in the sub-accounts into the Loan Account to secure the loan. The Loan Account is a pat of the Company's General Account. Amounts held in the Loan Account are credited monthly with a fixed rate of interest equal to an annualized rate of 4%. Interest in excess of 4.0% may be applied as determined by the Insurance Company.

A policy owner may surrender the policy at any time during the life of the insured. The amount received in the event of a surrender is the Cash Value. A partial surrender may be made at any time after the second policy anniversary. A partial surrender must be at least $5,000, and the Cash Value after the Partial Surrender must be at least $100,000. As of the effective date of any partial surrender, the Fund Value will be reduced by the amount surrendered. There is no fee associated with partial surrenders. No partial surrenders will be permitted during the first policy year.

The date at which the policy matures is the policy anniversary after the insured's age 100, at which time the cash value is payable as the maturity benefit. The policyholder may extend coverage beyond the Maturity Age. Election may be made to defer the payment of the maturity benefit to the date of the insured's death.

Since the policy's death benefit is defined such that the fund value is equal to the 7702 Cash Value Accumulation Test net single premium, and that there are no surrender charge, compliance with The Standard Non-Forfeiture Law (SNFL) is assured. The reserves are CRVM reserves based on 1980 Commissioners Standard Ordinary Age Last Birthday Mortality Tables, and a valuation interest rate of 4.5%. In no event will these reserves be less than the cash value of the policy.

The policy has advantages for the asset manager. It complements and augments, rather than competes with, the goal of the asset manager to increase the amount of assets under management. Eligible clientele of the asset manager may choose to move assets not currently managed by the asset manager into the policy. Assets with the sub-accounts are likely to be more "adhesive" as a result of the tax favored treatment of life insurance in general and the particularly competitive cost for the life insurance death benefit. Furthermore, the offering of the policy does not divert asserts under the asset manager's management and does not dilute any of the asset manager's fee revenue, such as by reduction or sharing of its investment management fees.

The policy also has advantages for the asset manager's clients. All insurance charges for the basic policy are guaranteed at policy issue, and do not increase as the insured ages, and can never be increased by the asset manager. The sum of any and all charges paid by the policy holder for the inherent tax advantages and death protection provided by the policy is less than typical. The policy is simple since the number and types of charges assessed within this policy are very few and very straightforward. In fact, the policyholder can understand and hypothesize their death benefits and values without the assistance of a sales illustration. The first product offered is a single premium design intended for tax-advantaged "wealth transfer" to the next generation. Accumulations grow tax-deferred and death benefits are paid income tax free.

The policy has the following specifications. Of course, these specifications are merely exemplary and may be changed if and as necessary to conform to any state insurance department regulations:
- Issue Ages: 40-85 (younger issue ages with prior insurer approval)
- Death Benefit Minimum required under LRC Sec. 7702, CVAT
- Minimum Premium: $1 million (but will consider $500,000 based on firm's clientele)
- Underwriting fee: $500
- Premium Taxes: Actual charge assessed by each state: 0.80% in New York, average of 2.00% elsewhere
- Federal DAC Charge: 1.25%
- M&E Charge: Varies by issue age bracket, gender and smoking status, GUARANTEED at issue for life
- Sales Load: None
- COI Charges: None, GUARANTEED for life
- Surrender Charges: None, GUARANTEED for life
- Other Charges: None retained by insurer, GUARANTEED for life (sponsoring firm assesses its portfolio management fees as a deduction from the funds under its management)
- Withdrawals: Unlimited number of withdrawals permitted, $5,000 minimum withdrawal amount
- Withdrawal Charge: None, GUARANTEED for life
- Transfers: Unlimited
- Transfer Fees None, GUARANTEED for life
- Policy Loans: 5.25% interest charged, with 4% credited back to policy Fund Value, GUARANTEED for life
- Maturity Extension: Continues the death benefit at age 100 without further M&E charges thereafter, GUARANTEED A further important consideration is an MEC. The initial offering—SPVUL—is a single premium life insurance product designed for tax-advantaged wealth transfer to the next generation. The policy is classified as a "MEC" under IRS rules and therefore will not enjoy the tax advantaged access to policy values, including certain surrenders and withdrawals as well as policy loans and other collateralized borrowing, accorded non-MEC policies. Planned future product offerings will focus on long-term cash accumulation and lifetime income distribution and will be structured so as to avoid MEC classification and provide tax advantaged access to policy values.

The financial strength of the insurance company backs the insurance guarantees. Preferably, the insurance company and its subsidiaries have a combined risk-based capital well in excess of the National Association of Insurance Commissioners company action level. In addition, the insurance company may have a large amount of available cash and access to additional money via the securitization of certain assets The process results in a life insurance product with the following attributes. It makes "tax efficient" that portion of an individual's investment portfolio that would otherwise incur unanticipated current income taxes. Ongoing expense charges—covering mortality, expenses, and profits to the insurer are composited and expressed as a guaranteed Mortality & Expense charge and are assessed on the account value of the policy rather than on the Net Amount at Risk (the difference between the face amount and cash value). The underlying life insurance policy does not define the policy's death benefit as equal to the stipulated death benefit, but rather is the account value plus the necessary "net amount at risk" required to qualify as Life Insurance for the insured's attained age at death. The number of charges is kept to a minimum as compared to other product forms and all charges assessable in the policy by the insurance company are expressed and guaranteed. The product developed using the process separates the risk element from the underlying investment or reserve element and allows different financial institutions to manage those elements.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of providing a variable universal life insurance product having a product life and including a death benefit and at least one associated investment vehicle to be managed, comprising:
   combining, by a computer system, a life insurance policy chassis from an insurance company with the at least one associated investment vehicle to form the variable universal life insurance product;
   determining, by the computer system, a cash value of investment assets of a policy holder within the at least one associated investment vehicle;
   determining, by the computer system, a cost of insurance rate, the cost of insurance rate being a percentage of the cash value of the investment assets of the policy holder, the percentage being guaranteed for the product life of the variable universal life insurance product;
   determining, by the computer system, an insurance charge by multiplying the cash value of the investment assets of the policy holder by the cost of insurance rate;
   charging the policy holder, by the computer system, the insurance charge;
   determining, by the computer system, the death benefit by multiplying the cash value of the investment assets by a death benefit percentage, the death benefit percentage being a percentage that decreases over time during the product life; and
   servicing, by the computer system, the variable universal life insurance product and the at least one associated investment vehicle.

2. The method of claim 1, wherein the step of charging the policy holder includes deducting the insurance charge from the at least one associated investment vehicle.

3. The method of claim 1, further comprising compensating the insurance company, by the computer system, with a fee funded solely from the at least one associated investment vehicle.

4. The method of claim 1, wherein the death benefit percentage is calculated, by the second computer system, at least in part based on factors used to determine the cost of insurance rate.

5. The method of claim 4, wherein the factors include age of an insured, gender of the insured, and tobacco use of the insured.

6. The method of claim 1, wherein the death benefit varies in value as a function of the cash value of the investment assets of the client policy holder.

7. The method of claim 1, wherein the death benefit does not include a minimum guaranteed value.

8. The method of claim 1, wherein the cash value of the investment assets of the policy holder does not include a guaranteed value.

9. The method of claim 1, wherein the death benefit percentage is established upon issuance of the variable universal life insurance product.

10. The method of claim 1, wherein the cost of insurance rate is a fixed percentage that varies during the product life.

11. The method of claim 1, wherein the only recurring charges paid to an insurance company for the variable universal life product is the insurance charge.

12. The method of claim 1, wherein the only recurring charges for the variable universal life product are the insurance charge and any taxes.

13. The method of claim 1, wherein the variable universal life product is funded by a single premium.

14. The method of claim 1, wherein the variable universal life product is funded by a plurality of premiums.

15. The method of claim 1, further including using each of the at least one associated investment vehicle as a sub-account of the variable universal life insurance product.

16. The method of claim 1, wherein the death benefit percentage decreases as an insured increases with age.

17. The method of claim 16, wherein the death benefit percentage is at least one hundred percent when the insured reaches age one hundred.

18. A system for servicing an insurance product of a policy holder, said insurance product having a product life and including a death benefit from an insurance policy provided by an insurance company, said system comprising:
a computer system configured to administer policy holder accounts having investment vehicles;
the computer system being configured to determine a cash value of each of the policy holder accounts;
the computer system being configured to store an insurance charge rate, the insurance charge rate being percentage of the cash value of each of the policy holder accounts, the insurance charge rate being guaranteed for the product life of the insurance product;
the computer system being configured to calculate an insurance charge by multiplying the insurance charge rate by the cash value of the policy holder accounts;
the computer system being configured to calculate the death benefit, the death benefit being determined by multiplying the cash value of the policy holder accounts by a death benefit percentage, the death benefit percentage being a percentage that decreases over time during the product life; and
an interface configured to make available to said policy holder information relating to the policy holder accounts administered by the computer system.

19. The system of claim 18, wherein the interface is accessible via a communications network.

20. The system of claim 19, wherein the computer system is further configured to exchange information related to said death benefit with the insurance company.

21. The system of claim 20, wherein the computer system is configured to forward the insurance charge to the insurance company related to said death benefit.

22. The system of claim 21, wherein the computer system is configured to deduct the insurance charge from the policy holder accounts.

23. The system of claim 18, wherein the interface makes available the information relating to the policy holder accounts and information relating to the death benefit of the insurance product.

24. The system of claim 18, wherein the death benefit varies in value as a function of the cash value of the policy holder accounts.

25. The system of claim 18, wherein the death benefit does not include a minimum guaranteed value.

26. The system of claim 18, wherein the cash value of the policy holder accounts does not include a guaranteed value.

27. The system of claim 18, wherein the death benefit percentage decreases as an insured increases with age.

28. A method of insuring a customer having investment assets through a variable life insurance policy, the variable life insurance policy having a policy life and further having a variable death benefit, the method comprising:
allocating, by a computer system, the investment assets to at least one investment fund, the investment assets having a cash value;
determining, by the computer system, a cost of insurance fee, the cost of insurance fee being a percentage of the cash value of the investment assets, the percentage being guaranteed for the policy life of the variable life insurance policy;
charging the investment assets, by the computer system, the cost of insurance fee; and
determining, by the computer system, the variable death benefit associated with the variable life insurance policy, by multiplying the cash value of the investment assets by a death benefit percentage, the death benefit percentage decreasing over time during the policy life.

29. The method of claim 28, wherein the variable death benefit is a minimum necessary to maintain the variable life insurance policy as a tax advantaged insurance policy.

30. The method of claim 29, wherein the step of charging the cost of insurance fee includes deducting the cost of insurance fee from the investment assets.

31. The method of claim 29, wherein the death benefit percentage is calculated, by the computer system, at least in part based on factors used to determine the cost of insurance fee.

32. The method of claim 31, wherein the factors include age of the customer, gender of the customer, and tobacco use of the customer.

33. The method of claim 29, wherein the variable death benefit varies in value as a function of the cash value of the investment assets of the customer.

34. The method of claim 29, wherein the variable death benefit does not include a minimum guaranteed value.

35. The method of claim 29, wherein the cash value of the investment assets of the customer does not include a guaranteed value.

36. The method of claim 29, wherein the death benefit percentage decreases as the customer increases with age.

37. A system for providing a variable life insurance contract having a contract life and further having a death benefit funded from associated investment assets, comprising:
a first computer system including an investment fund manager interface, the first computer system being configured for use by an investment fund manager to determine a cash value of the associated investment assets, provide access to respective clients of the investment fund manager a variable life insurance contract, and manage the associated investment assets which fund the death benefit of the respective contract; and a second computer system including a death benefit insurer interface, the second computer system being configured for use by a death benefit insurer to provide the death benefit for each respective contract, the death benefit being determined by multiplying the cash value of the associated investment assets by a death benefit percentage, the death benefit percentage decreasing over time during the contract life, determine a compensation fee to provide the death benefit, the compensation fee being determined by multiplying the cash value of the associated investment assets by a cost of insurance percentage, the cost of insurance being guaranteed for the contract life of the variable life insurance contract, and obtain the compensation fee from the investment fund manager;

wherein the first computer system and the second computer system are connected over a communications network.

38. The system of claim 37, wherein at least one of the investment fund manager interface and the death benefit insurer interface is accessible via the communications network.

39. The system of claim 37, wherein the first computer system is further configured to exchange information with the second computer system related to the death benefit.

40. The system of claim 39, wherein the first computer system is further configured to forward a fee to the second computer system related to said death benefit.

41. The system of claim 40, wherein the first computer system is configured to deduct the fee from the associated investment assets.

42. The system of claim 39, wherein the second computer system is further configured to exchange information with the first computer system related to the compensation fee.

43. The system of claim 42, wherein the information related to the compensation fee is the cost of insurance percentage of the value of the associated investment assets.

44. The system of claim 39, wherein the investment fund manager interface makes available information relating to the accounts of the insurance product managed by the asset manager and information relating to the death benefit of the insurance product.

45. The system of claim 37, wherein the death benefit is a minimum necessary to maintain the variable life insurance contract as a tax advantaged insurance policy.

46. The system of claim 37, wherein the death benefit percentage is calculated, by the second computer system, at least in part based on factors used to determine the compensation fee.

47. The system of claim 46, wherein the factors include age of an insured, gender of the insured, and tobacco use of the insured.

48. The system of claim 37, wherein the death benefit varies in value as a function of the cash value of the associated investment assets.

49. The system of claim 37, wherein the death benefit does not include a minimum guaranteed value.

50. The system of claim 37, wherein the cash value of the associated investment assets does not include a guaranteed value.

51. The method of claim 37, wherein the death benefit percentage decreases as an insured increases with age.

* * * * *